(12) United States Patent
Ishii et al.

(10) Patent No.: US 7,509,022 B1
(45) Date of Patent: Mar. 24, 2009

(54) RECORDING MEDIUM AND SYSTEM FOR RECORDING AND REPRODUCING THE RECORDING MEDIUM

(75) Inventors: Hidehiro Ishii, Saitama-ken (JP); Tadashi Noguchi, Saitama-ken (JP); Toshiro Tanikawa, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/492,009

(22) Filed: Jan. 27, 2000

(30) Foreign Application Priority Data

Jan. 28, 1999 (JP) ................... 11-020345

(51) Int. Cl.
*H04N 5/91* (2006.01)
(52) U.S. Cl. .................. 386/95; 386/125; 386/126
(58) Field of Classification Search .............. 386/46, 386/94, 95, 52, 55, 65, 98, 125, 126; 369/53.21
See application file for complete search history.

(56) References Cited

U.S. PATENT DOCUMENTS

| | | | |
|---|---|---|---|
| 5,644,444 A | | 7/1997 | Braithwaite et al. |
| 5,729,516 A | * | 3/1998 | Tozaki et al. ............. 369/53.21 |
| 5,966,495 A | * | 10/1999 | Takahashi et al. ............. 386/68 |
| 6,289,166 B1 | * | 9/2001 | Uno et al. ..................... 386/46 |
| 6,330,392 B1 | * | 12/2001 | Nakatani et al. .............. 386/52 |
| 6,389,222 B1 | * | 5/2002 | Ando et al. ................... 386/95 |
| 6,577,811 B1 | | 6/2003 | Kikuchi et al. |

FOREIGN PATENT DOCUMENTS

| | | |
|---|---|---|
| EP | 0 346 979 A2 | 12/1989 |
| EP | 0 635 835 A2 | 1/1995 |
| EP | 0 911 825 A2 | 4/1999 |

* cited by examiner

*Primary Examiner*—Huy T Nguyen
(74) *Attorney, Agent, or Firm*—Steve A. Wong

(57) ABSTRACT

A recording medium has a first recording area on which recording information is recorded as a set of recording units, and a second recording area on which control information for controlling the recording information to be recorded on the first recording area is recorded. Identifying information for identifying a management condition of the recording information recorded on the first recording area is also recorded on the second recording area at every recording unit.

5 Claims, 8 Drawing Sheets

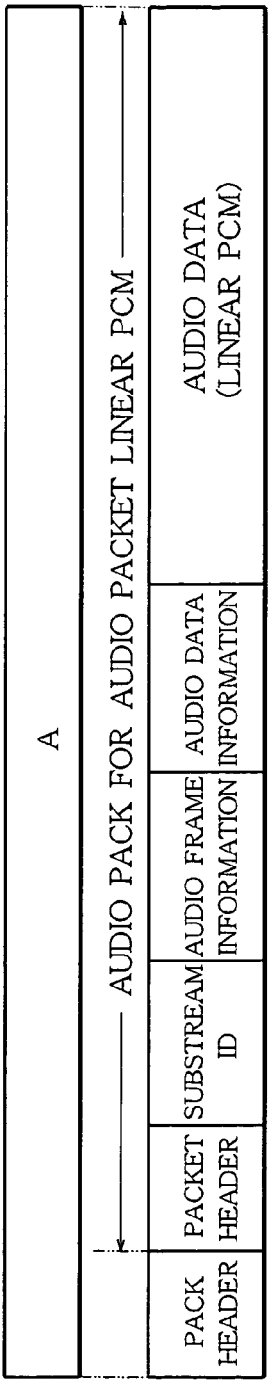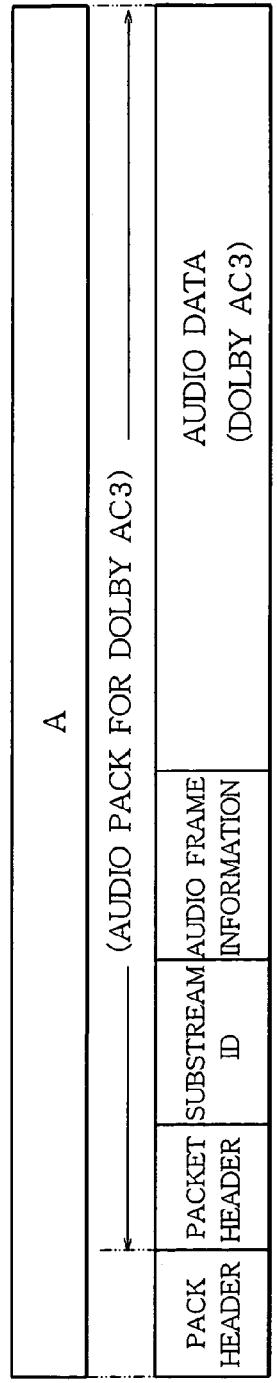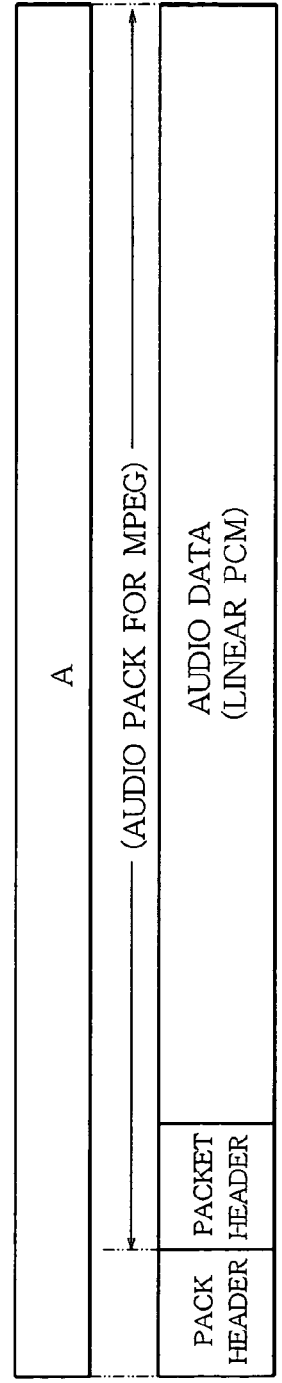

RECORDING MEDIUM AND SYSTEM FOR RECORDING AND REPRODUCING THE RECORDING MEDIUM

BACKGROUND OF THE INVENTION

The present invention relates to a recording medium such as DVD-RW and the like, and a system for recording and reproducing the recording medium, and more particularly to a recording medium having a logical data structure for erasing recorded information and for protecting recorded information.

As an erasable recording medium, the floppy disc, audio cartridge tape, video cartridge tape, and others are known. The case of the floppy disc has a movable lug for setting the floppy disc to a recording inhibiting state and to a recording enabling state. When the movable lug is shifted to a record unable position by a user, recording (writing) of new recording information by a reproducing device is inhibited, thereby protecting the recorded information. When the movable lug is shifted to a record enable position, recorded information is initialized, or new information can be overwritten, thereby erasing the recorded information.

In the audio cartridge and video cartridge, a projected piece is provided on an end of the cartridge case. When the piece is removed by the user, the overwriting of new information on the recorded information is inhibited, thereby protecting the recorded information. On the other hand, when the projected piece is remained, new information can be overwritten, thereby erasing the recorded information.

Meanwhile, a DVD-Video using optical technique has been developed as a reproduction-exclusive recording medium which is possible to provide audio information and video information each having high quality compared with the above described recording medium. In recent years, the DVD-Video and DVD-RW (rewritable) has been remarked. The DVD-RW has a large recording capacity and is erasable and rewritable, keeping the physical compatibility in the DVD family including the DVD-Video.

The DVD-RW is a recording medium capable of making various titles and variously editing compared with the floppy disc, audio cartridge tape and video cartridge tape.

Therefore, it is possible to protect and erase recorded information by soft processing, unlike the floppy disc and others where the protect and erasure are performed by mechanical process. Furthermore, there has desired that the DVD-RW having a logical data structure enabling various title editing by effectively utilizing the characteristic of the disc is developed, keeping the physical compatibility in the DVD family.

SUMMARY OF THE INVENTION

An object of the present invention is to provide a recording medium which may be set to a recording erasing state and recording enabling state by a software process.

Another object of the present invention is to provide a recording medium having a logical data structure enabling various title editing, and a reproducing system using the recording medium.

According to the present invention, there is provided a recording medium comprising, a first recording area on which recording information is recorded as a set of one or more recording unit, a second recording area on which control information for controlling the recording information to be recorded on the first recording area is recorded, and identifying information for identifying a management condition of the recording information recorded on the first recording area is recorded at every recording unit.

The set of the recording unit comprises a first set of one or more recording unit, and a second set of one or more first set, and the identifying information identifies the management condition of the recording information recorded on the first recording area as a set of the first set and second set.

The identifying information comprises first identifying information for editing the recording information at every recording unit, second identifying information for protecting the recording information at every recording unit, third identifying information for providing a logical erased condition at every recording unit, and fourth identifying information for providing a physical erase at every recording unit.

The first identifying information and the second identifying information are mutually changeable, the first identifying information can be changed to the third identifying information, and the third identifying information can be changed to the first identifying information under a predetermined condition, the fourth identifying information allows changing from the first identifying information and the third identifying information.

The present invention further provides a system for recording information on a recording medium having a first recording area on which recording information is recorded as a set of one or more recording unit, and a second recording area on which control information for controlling the recording information to be recorded on the first recording area is recorded, comprising, control means for recording identifying information on the second recording area, said identifying information being provided for identifying a management condition of the recording information recorded on the first recording area at every recording unit.

The control means reproduces the identifying information recorded on the second recording area, thereby providing information of the management condition at every recording unit.

These and other objects and features of the present invention will become more apparent from the following detailed description with reference to the accompanying drawings.

BRIEF DESCRIPTION OF DRAWINGS

FIGS. 4a to 4c show audio packs;

DETAILED DESCRIPTION OF THE PREFERRED EMBODIMENT

Figure 1:
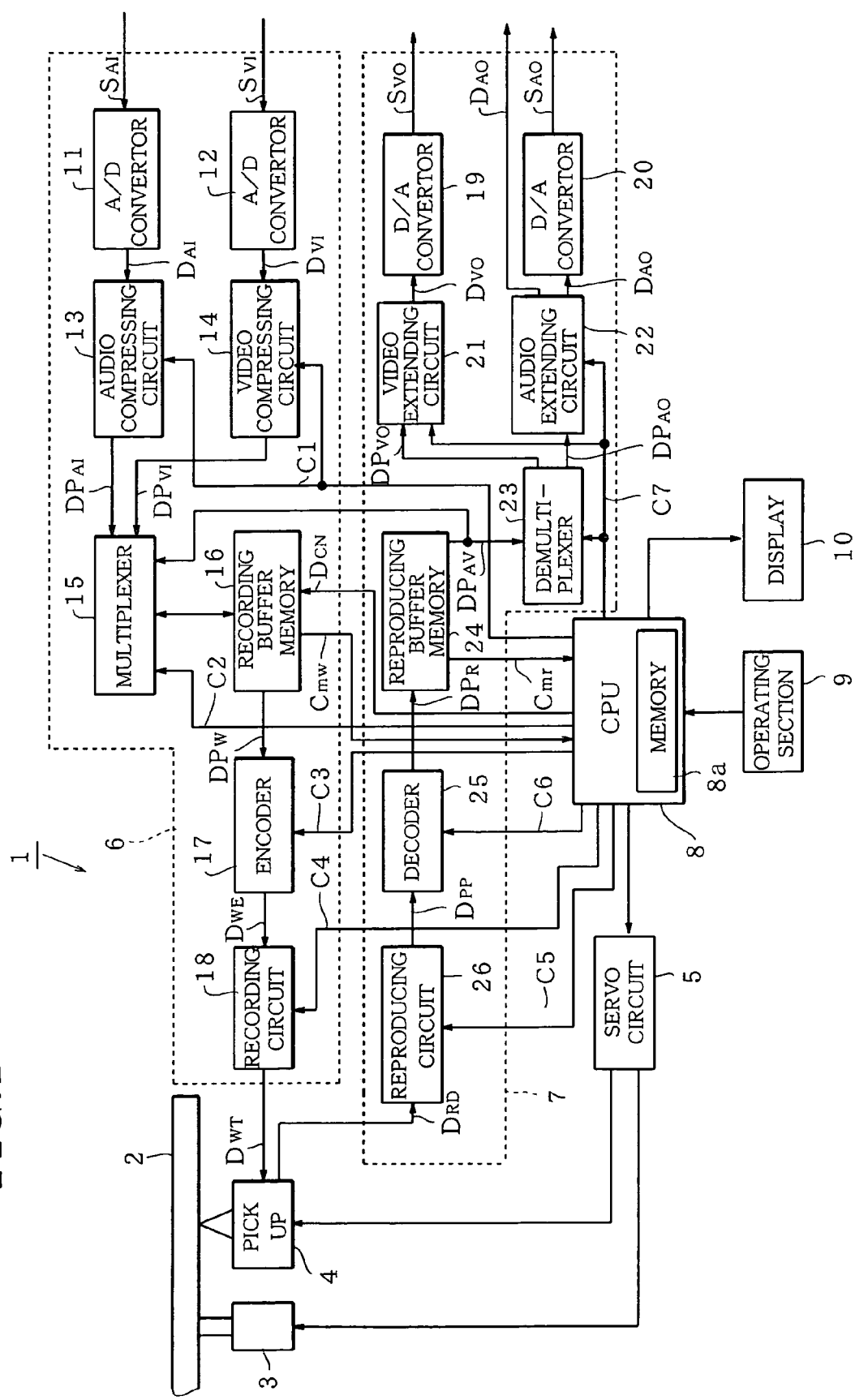
FIG. 1 is a block diagram showing a recording and reproducing system of the present invention.

Referring to FIG. 1, a recording and reproducing system 1 of the present invention comprises a spindle motor 3 for rotating a DVD-RW 2, pickup 4 for recording and reproducing information on and from the DVD-RW 2, servo circuit 5 for controlling the spindle motor 3 and pickup 4, recording system 6 for producing data to be recorded on the DVD-RW 2, reproducing system 7 for reproducing data recorded on the DVD-RW 2, central control circuit 8 for controlling the system 1, operating section 9 for instructing the central control system 8 to control the system by a user, and display 10.

The recording system 6 comprises an A/D converters 11 and 12, audio compressing circuit 13, video compressing circuit 14, multiplexer 15, recording buffer memory 16, encoder 17 and recording circuit 18.

The A/D converter 11 converts an input audio analog signal $S_{AI}$ to a digital audio data $D_{AI}$.

The audio compressing circuit 13 compresses the audio data $D_{AI}$ designated by a control signal C1 applied from the central control circuit 8 to produce a compressed audio data $DP_{AI}$ which is fed to the multiplexer 15. In the present embodiment, the data compression systems in accordance with the AC-3 and MPEG audio data standards are used. One of the systems can be selected by operating the operating section 9.

The A/D converter 12 converts an input analog video signal $S_{VI}$ to a digital video data $D_{VI}$. The video compressing circuit 14 compresses the video data $D_{VI}$ in accordance with the MPEG 2 video format (ISO 13818-2) to produce a compressed video data $DP_{VI}$ which is fed to the multiplexer 15.

The multiplexer 15 multiplexes the compressed audio data $DP_{AI}$ with the compressed video data $DP_{VI}$ at a predetermined timing designated by a control signal C2 from the central control circuit 8 to produce a compressed data $DP_W$ which is time-shared.

The recording buffer memory 16 temporarily stores the compressed audio data $DP_{AI}$ and the compressed video data $DP_{VI}$ to produce the compressed data $DP_W$, cooperating with the multiplexer 15. The compressed data $DP_W$ is fed to the encoder 17. Further, the recording buffer memory 16 applies a data quantity signal Cmw representing the length of the data to the central control circuit 8. A data quantity is displayed on the display 10 in accordance with a signal from the central control circuit 8, based on the data quantity signal Cmw.

The encoder 17 encodes the compressed data $DP_W$ in accordance with a control signal C3 from the central control circuit 8 to produce an encoded data $D_{WE}$ which is fed to the recording circuit 18.

As described hereinafter in detail, the encoder 17 further produces a navigation data necessary for the reproduction, in particular produces data FLG (hereinafter called identifier) for managing the recording information as one of the navigation data in unit of the video object (VOB) or in unit of title.

The recording circuit 18 power-amplifies the encoded data $D_{WE}$ (including navigation data) in accordance with a control signal C4 from the central control circuit 8 to produce a recording data $D_{WT}$ which is applied to the pickup 4.

A semiconductor laser provided in the pickup is driven by the recording data $D_{WT}$ to emit a laser beam, so that the recording data $D_{WT}$ is recorded on the DVD-RW 2.

The reproducing system 7 comprises a D/A converter 19 and 20, video extending circuit 21, audio extending circuit 22, demultiplexer 23, reproducing buffer memory 24, decoder 25 and reproducing circuit 26.

The reproducing circuit 26 shapes the waveform of a detected signal $D_{RD}$ read out from the DVD-RW 2 by the pickup in accordance with a control signal C5 from the central control circuit 8 to produce a binary reproducing data $D_{PP}$ which is fed to decoder 25.

The decoder 25 decodes the reproducing data $D_{PP}$ based on a predetermined decode system corresponding to the encode system of the encoder 17 in accordance with a control signal C6 from the central control circuit 8 to produce a decoded data $DP_R$ which is applied to the reproducing buffer memory 24.

The buffer memory 24 temporarily stores the decoded data $DP_R$ and sends a navigation data Cmr included in the decoded data $DP_R$ to the central control circuit 8. Furthermore, the reproducing memory 24 arranges the temporarily storing decoded data $DP_R$ into a decoded data $DP_{AV}$ in synchronism with a predetermined timing. The decoded data $DP_{AV}$ is fed to the demultiplexer 23.

The demultiplexer 23 demultiplexes a compressed video data $DP_{VO}$ and a compressed audio data $DP_{AO}$ which are multiplexed in the decoded data $DP_{AV}$ in accordance with a control signal C7 from the central control circuit 8. The compressed video data $DP_{VO}$ is supplied to the video extending circuit 21, and the compressed audio data $DP_{AO}$ is supplied to the audio extending circuit 22.

The video extending circuit 21 extends the compressed video data $DP_{VO}$ by performing predetermined extending process corresponding to the compression system of the video compression circuit 14 to produce an extended video data $D_{VO}$. The D/A converter 19 converts the video data $D_{VO}$ to produce an analog video signal $S_{VO}$.

The audio extending circuit 22 extends the compressed audio data $DP_{AO}$ by performing predetermined extending process corresponding to the compression system of the audio compression circuit 13 to produce an extended audio data $D_{AO}$. The D/A converter 20 converts the audio data $D_{AO}$ to produce an analog audio signal $S_{AO}$.

The central control circuit 8 has a memory 8a storing a system program and others and a CPU for controlling the operation of the whole system.

Namely, the central control circuit 8 controls the operation of the servo circuit 5, the recording system 6, and the reproducing system 7, and displays present operation content of the reproducing device 1, various informations relative to recording information and reproduction information, menus indicating a manipulation method and others on the display 10.

Furthermore, the central control circuit 8 identifies the management condition of the recorded information and controls to change a corresponding video object (VOB) or an identifier FLG of a title in accordance with an identifier FLG included in the navigation data Cmr when the user instructs the change of the video object (VOB) or the identifier FLG of the title with the operating section 9.

Hereinafter described is a logical data structure of the DVD-RW 2. The DVD-RW 2 has a hardware compatibility with the DVD-Video and has a common logical data structure to the DVD-Video. Here the characteristic of the DVD-RW will be described.

Figure 2:
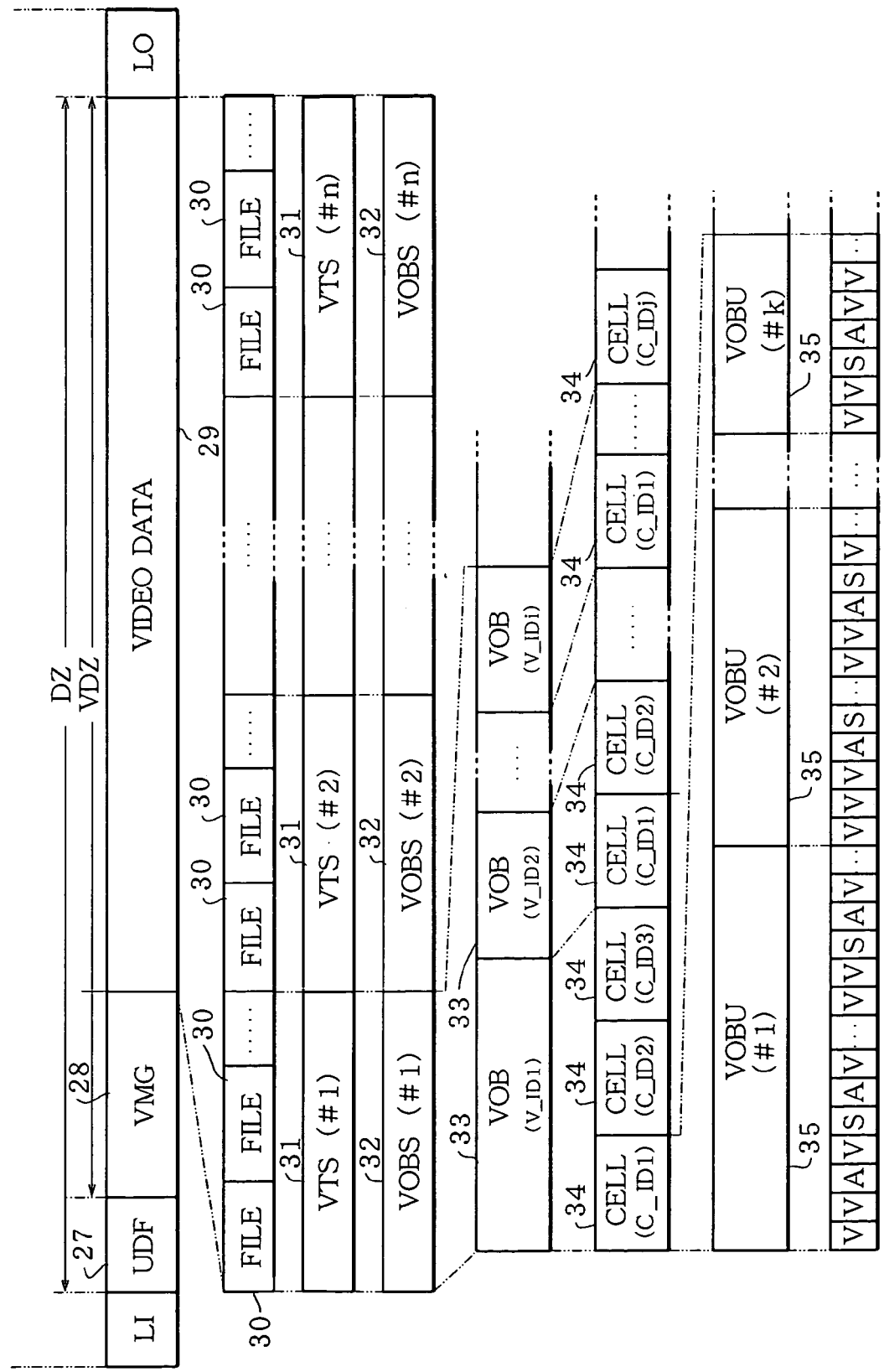
FIG. 2 is an illustration showing a structure of a logical data of a recording medium of the present invention.

FIG. 2 shows the whole logical data structure. The DVD-RW 2 comprises a lead-in area LI at the inner end portion of the disc, data recording area DZ and lead-out area LO assigned to an outside track.

The data recording area DZ comprises a UDF recording area 27 wherein a micro-Universal Disc Format (UDF) as a logical format representing the relationship between the physical address and the logical address is recorded, and a video data recording area VDZ.

The video data recording area VDZ comprises a video manager recording area 28 wherein a control data having a video manager information (VMGI) is recorded, and a video data recording area 29 wherein video data, audio data, and others are recorded.

In the video data recording area 29, data are recorded as a plurality of files 30 which are divided into a plurality of sets each of which comprises a plurality of files. Further, the sets are hierarchized as a set of the set unit, cell unit, unit unit, pack unit and others.

As an uppermost order recording unit, there is provided video title sets (VTS: Video Title Set) 31 from #1 to #n wherein a video title can be recorded. Each video title set is combined with a video object set (VOBS: Video Object Set) 32.

Each video object set 32 comprises one or more video object (VOB) 33 and is identified by an ID number (V-ID1~V-IDi).

Each video object 33 comprises one or more cell (CELL) 34, and each cell 34 comprises one or more video object unit (VOBU) 35. Each cell 34 is identified by an ID number (C-ID1~C-IDj).

Here, video data is called video pack V. The audio data is divided into an audio pack A and a subpicture pack S for letter information. Further, sets of one or more video packs V, audio packs A and subpicture packs S are set as a video object unit (VOBU) 35.

Thus, the presentation data comprising the video pack V, audio pack A and subpicture pack S is hierarchized by the video object unit 35, cell 34, video object 33, video object set 32, and video title set 31. The data is reproduced in accordance with program chain information (PGCI) included in video manager information (VMGI).

Figure 3:
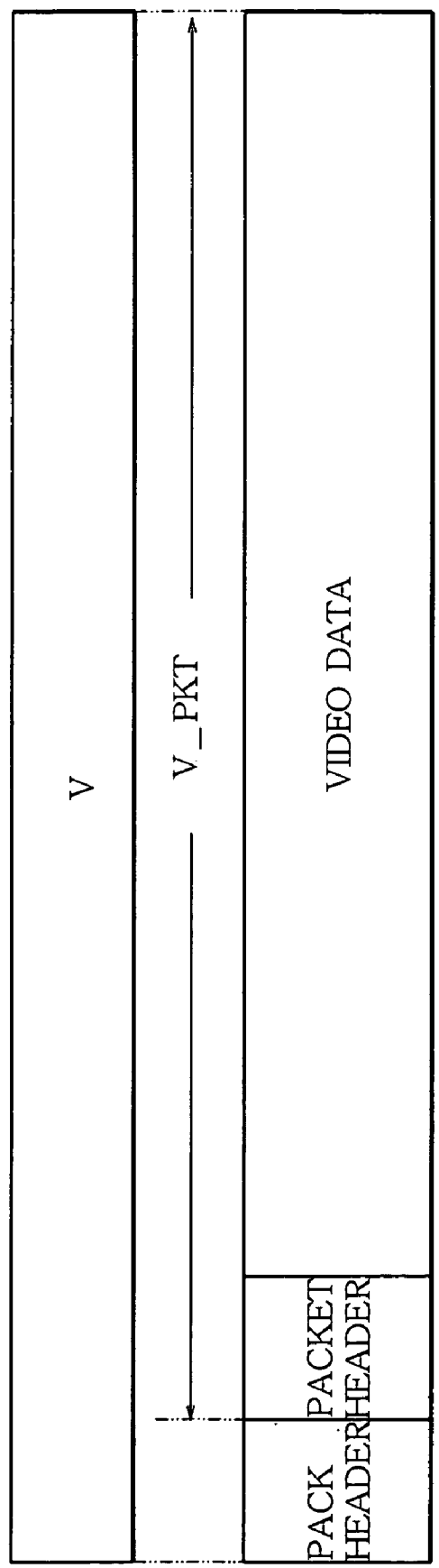
FIG. 3 shows a video pack.

Referring to FIG. 3, a pack header, packet header and video data are recorded in the video pack V.

In the audio pack A, audio data are variously recorded in accordance with the difference of the compression system as shown in FIGS. 4a, 4b and 4c.

Figure 5:
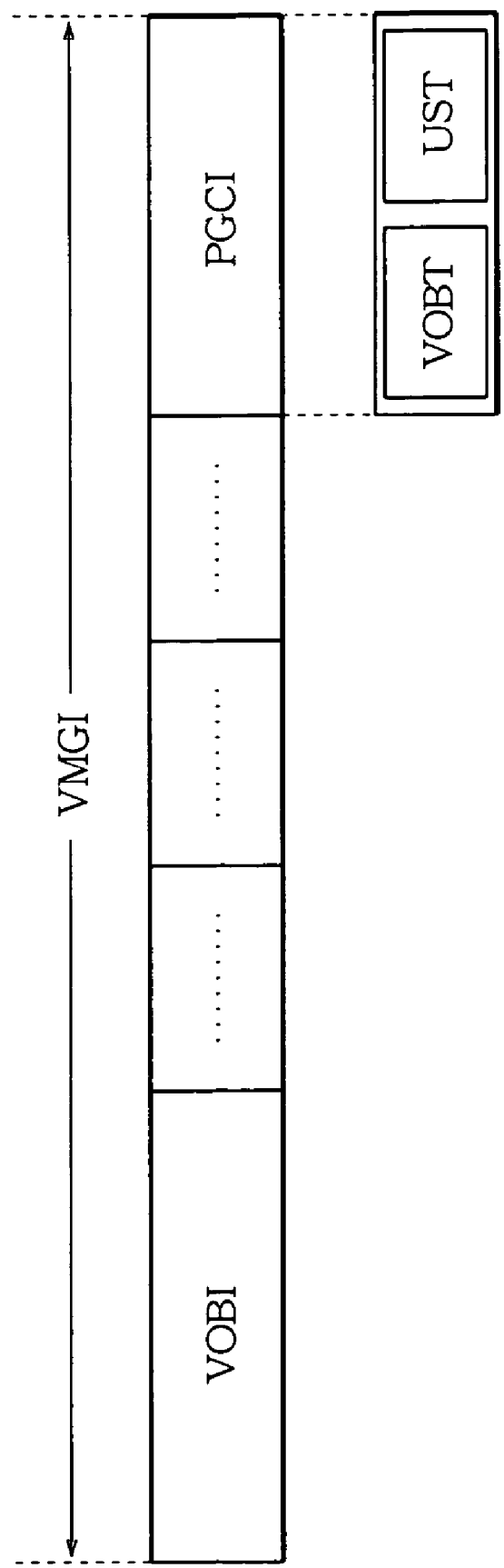
FIG. 5 shows video management information.

Referring to FIG. 5, in the video manager recording area 28, video manager information (VMGI) including at least the program chain information (PGCI) and video object information (VOBI) is recorded.

The video object information is information relative to the attribute of each video object, and provided with the attribute table indicating the video pack V, audio pack A and subpicture pack S which are included in the video object.

The program chain information (PGCI) is provided with information indicating reproducing order of the presentation data, which is assigned at the video title sets VTS(#1)~VTS(#n) and the video objects VOB(#1)~VOB(#n), by the order of the cells (CELL), with a video object identifier table (VOBT) and a user title identifier table (UST).

Figure 6:
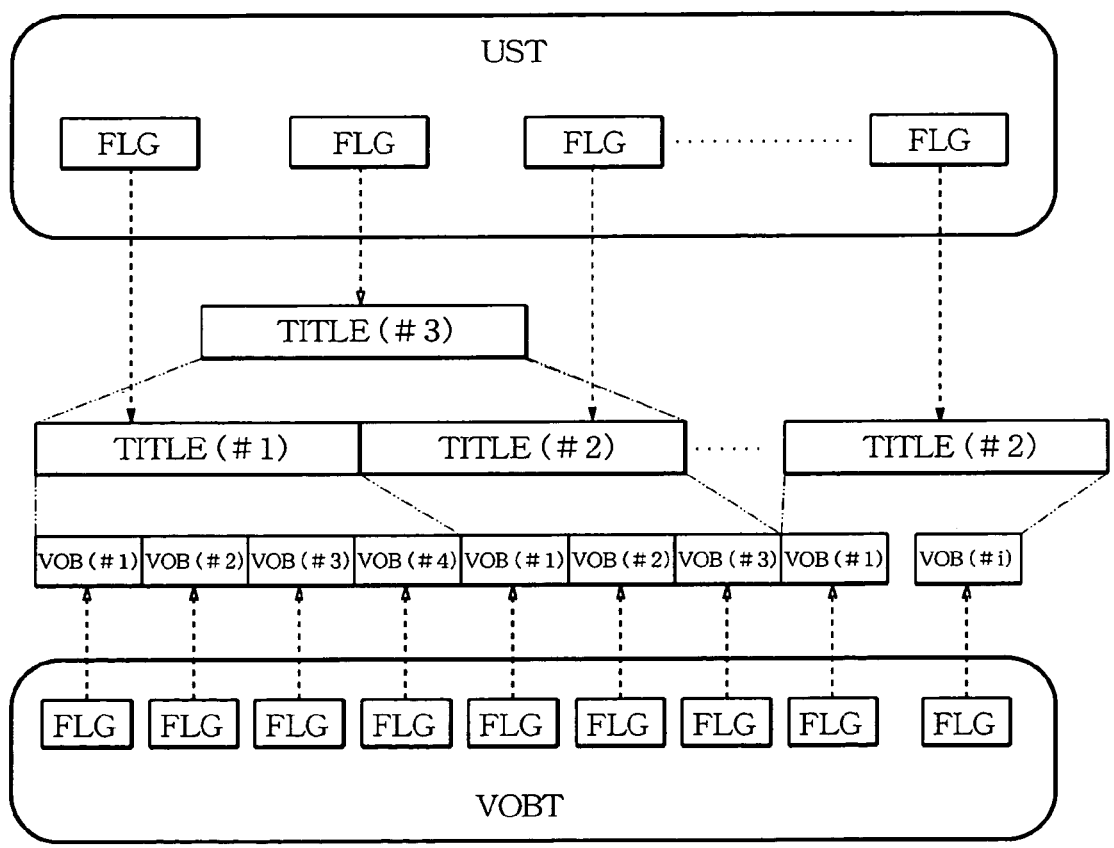
FIG. 6 shows identification tables.

As shown in FIG. 6, the video object identifier table (VOBT) is a table for the batch management of each identifier FLG applied to each video object (VOB), and the user table identifier table (UST) is a table for the batch management of each identifier FLG applied to each title prepared by the user.

Namely, one identifier FLG is applied to each video object (VOB), so that the edit of each video object (VOB) is indicated.

One identifier FLG is applied to each title so that the edit of each title is indicated. Furthermore, as the title (#3) in the drawing, the identifier FLG is applied to the title for a plurality of titles (#1), (#2).

The kinds of the identifier FLG are described hereinafter. There is provided four kinds of identifier such as an editable identifier NFLG, protective identifier PFLG, pseudo erase identifier TEFLG, and complete erase identifier CEFLG.

Figure 7:
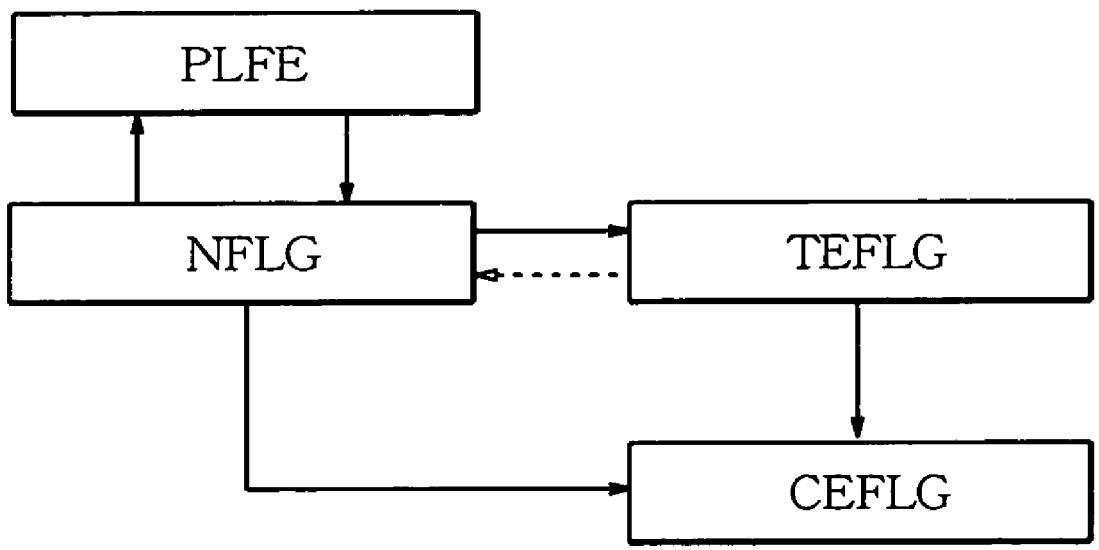
FIG. 7 shows functions of the identification.

These identifiers comprise, as shown in FIG. 7, reversible identifiers and non-reversible identifiers.

The editable identifier NFLG is an identifier for designating that it is possible to variously edit at every video object (VOB) or every title. For example, the editable identifier is applied to a newly recorded video object (VOB) or title in the default condition. The user can edit the new video object (VOB) or the title by applying the editable identifier.

The protective identifier PFLG is an identifier applied to a desired video object (VOB) or title when the objet or title is not erased so as to preserve it. Namely, the protective identifier PFLG is provided for inhibiting the reproducing system from erasing the video object or the title to which the protective identifier is applied. Further, the identifier inhibits the edit of the video object or the title. Furthermore, each of the protective identifier PFLG and the editable identifier is reversible identifier, and hence the user can change the protective identifier with editable identifier, and vice versa.

The pseudo erase identifier TEFLG is an identifier applied to a desired video object or title in order to ease it. By changing the editable identifier NFLG to the pseudo erase identifier, the corresponding video object or title can be erased.

The pseudo erase identifier TEFLG does not physically erase the corresponding video object or the title, but is provided for setting a seemingly erased condition. Therefore, the video object or title applied with the pseudo erase identifier is held in the recorded condition on the DVD-RW 2 as it is. However, the pseudo erase identifier cannot be changed to the editable identifier without using a particular program stored in the memory 8a of the central control circuit 8.

The complete erase identifier CEFLG is provided to erase the video object and title recorded on the DVD-RW 2. Namely, when the user changes the video object (VOB) or the title on which the editable identifier NFLG or pseudo erase identifier TEFLG is attached with the complete erase identifier CEFLG, corresponding video object (VOB) or title remains in the DVD-RW 2. However, a new title can be overwritten, which means that the video object or the title is substantially erased. As a recordable area upon recording a new title, a usable area for overwriting can be obtained by erasing an actually corresponding video object.

The operation for recording information and editing information by the system 1 is described hereinafter.

In the system 1 of FIG. 1, when recording of, for example television broadcast, is started, the audio signal $S_{AI}$ and video signal $S_{VI}$ are processed by the A/D converters 11 and 12, the audio compression circuit 13 and the video compression circuit 14. The compressed audio data $D_{AI}$ and compressed video data $D_{VI}$ are multiplexed by the multiplexer 15 and encoded by the encoder 17 and fed to the pickup 4 through the recording circuit together with navigation data relative to the attribute, so that the data are recorded on the DVD-RW 2.

When the television broadcast is recorded on the DVD-RW 2 as a title, the editable identifier NFLG is applied to the title and to the video object (VOB) composing the title. The identifiers are managed by the user title identifier table (UST) and the video object table (VOBT) shown in FIG. 6.

Figure 8:
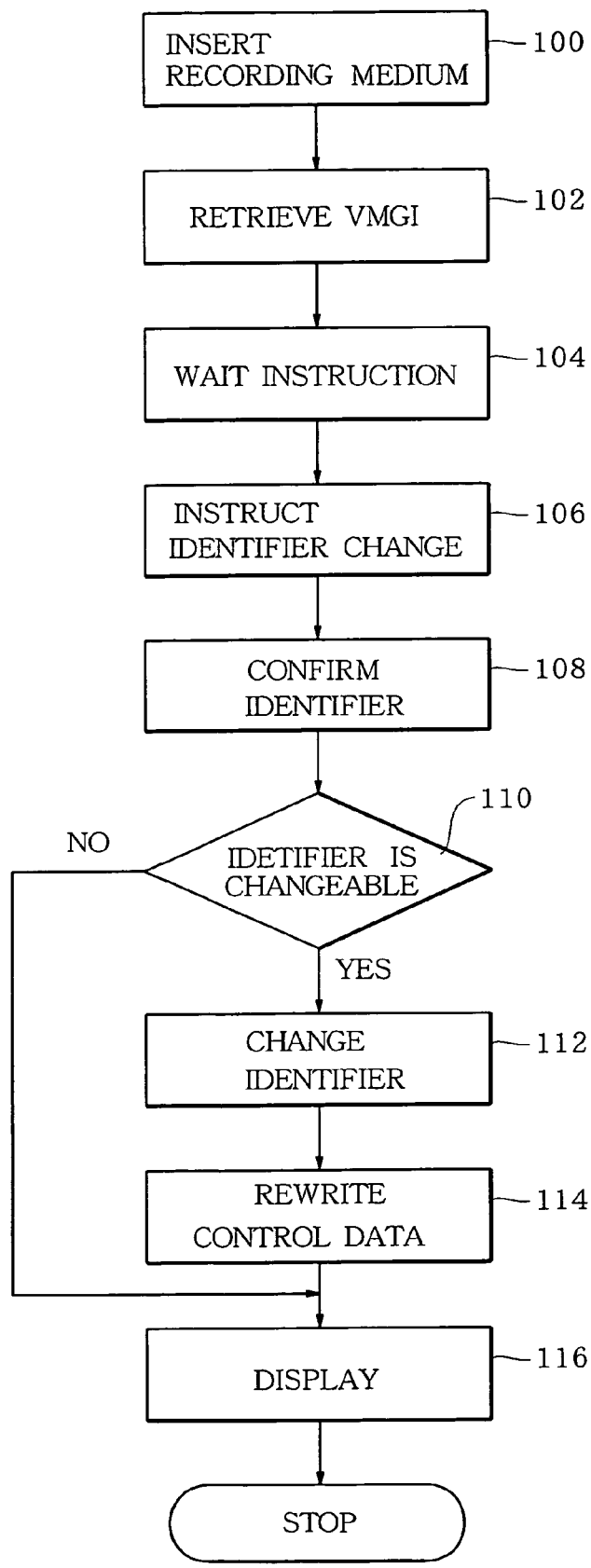
FIG. 8 is a flowchart of operation of the system of the present invention.

The operation of the system 1 for editing the recorded title will be described hereinafter with reference to the flowchart of FIG. 8.

When the user closes the power switch of the system 1 and the DVD-RW 2 is inserted (step 100), the video manager information recorded on the DVD-RW 2 is read out at a step 102, and the read information is fed to the reproducing system 7. The video manager information is inputted in the system 7 through the reproducing circuit 26 and decoder 25 and recorded in the reproducing buffer memory 24, and instruction of the user is waited (step 104).

At the step 104, when the user instructs a desired title to be edited or a desired video object composing the title, the attribute of the title or the video object is displayed on the display 10.

At a step 106, when the user instructs to change the identifier applied to title or video object to another identifier, the program proceeds to a step 108.

At the step 108, the central control circuit 8 retrieves the program chain information (PGCI) and the data Cmr of the identifier FLG from the video manager information (VMGI) stored in the buffer memory 24. Furthermore, the central control circuit 8 confirms the identifier applied to the title or video object based on the program claim information and the identifier.

Thereafter, at a step 110, it is determined whether the identifier newly instructed by the user satisfies the condition shown in FIG. 7. For example, when the present identifier is the pseudo erase identifier, and the instruction of the user is to change it to editable identifier, the determination is NO. When the present identifier is the editable identifier, and the instruction of the user is to change it to the protective identifier, the determination is YES. When the determination is NO, the program goes to a step 116, where a display that there is an error in identifier changing instruction, for example, "It is impossible to change 000 identifier to XXX identifiers" is displayed on the display 10, and the program ends. If YES, the program proceeds to a step 112, where final confirmation that the change of the identifier may be started is displayed on the display 10. In response to the display, the user instructs the start. Accordingly, data of a new identifier are fed to the multiplexer 15 from the central control circuit 8, and the present identifier in the user title identifier table (UST) or in the video object identifier table (VOBT) in FIG. 6 is changed to the new identifier.

At a step 114, in the case that the title stream is changed by the changing of the identifier, the management data such as the program chain information (PGCI) indicating the reproducing order of the video object belonging to the title is changed to a proper condition.

For example, in the case that the identifier of the video object VOB (#2) belonging to the title (#1) of FIG. 6 is changed to the complete erase identifier CEFLG, the remaining video objects VOB (#1), VOB (#3) and VOB (#4) are changed to the set of the title (#1), and the program chain information (PGCI) and others are rewritten so as not to generate conflict in the reproducing order.

When the identifier of the title (#1) is not changed, and the identifiers of the video object VOB (#1)~VOB (#4) comprising the title (#1) are changed to different identifiers, the identifier of title (#1) is changed to the same identifier as identifier of the video objects VOB (#1)~VOB (#4). For example, when the identifier of the title (#1) is not changed, that is the editable identifier, the video objects VOB (#1)~VOB (#4) are changed from the editable identifiers to the protective identifiers PFLG, the identifier of the title (#1) is forcibly changed to the protective identifier.

When the optimizing process accompanying with the change of identifier is completed, the completion of the change of the identifier, and video manager information after the change are displayed on the display 10 at the step 116.

In accordance with the present invention, since titles and video objects are managed by the identifiers FLG, the user can freely manage and edit the titles and video objects by using the identifiers. In particular, since the identifier can be changed at every video object, various edits can be performed.

Although the DVD-RW is explained in the embodiment, the present invention is not limited to the disc, and may be applied to the video object such as the DVD-R which can not be physically erased, but is possible to record recording information.

While the invention has been described in conjunction with preferred specific embodiment thereof, it will be understood that this description is intended to illustrate and not limit the scope of the invention, which is defined by the following claims.

What is claimed is:

1. An information recording method for use with a recording apparatus, the method complying with an optical disc format and comprising the steps of:

recording record information on a recording medium, the record information including 1) a plurality of VOBUs which are physical information of the record information, 2) one or more VOBs which are management information for managing the VOBUs as physical information units, each of which contains one or more VOBUs and 3) one or more titles which are reproduction control information for controlling reproduction of the VOBUs, each of which contains one or more VOBUs;

recording first identifying information on the recording medium; and recording second identifying information on the recording medium;

wherein the first identifying information corresponds to each of the one or more VOBs and indicates whether a corresponding VOB is in a logically erased state, and the second identifying information corresponds to each of the one or more titles and prevents erasing or editing of a corresponding title.

2. The information recording method according to claim 1, wherein the second identifying information indicates whether a corresponding title is to be protected.

3. An information recording system for recording a data structure on a recording medium, the system complying with an optical disc format and comprising:

a first recording device which records record information of the data structure on a recording medium, the record information including (1) one or more VOBUs which are physical information of the record information, (2) one or more VOBs which are management information for managing the VOBUs as physical information unit, each of which contains one or more VOBUs, and (3) one or more titles which are reproduction control information for controlling reproduction of the VOBUs, each of which contains one or more VOBUs;

a second recording device which records first identifying information on the recording medium, the first identifying information being related to each of the VOBs and including a first data protection flag that prevents erasing or editing of a corresponding VOB; and a third recording device which records second identifying information on the recording medium, the second identifying information being related to each of the titles and including a second data protection flag that prevents erasing or editing of a corresponding title, wherein the first identifying information indicates whether a corresponding VOB is in a logically erased state.

4. The information recording method recited in claim 1, wherein, when one of the first identifying information and the second identifying information is changed by the recording apparatus, the other of the first identifying information and the second identifying information is changed by the recording apparatus relative to and in response to the change in the one of the first identifying information and the second identifying information.

5. The information recording method recited in claim 3, wherein, when one of the second recording device and the third recording device changes one corresponding identifying information, the other of the second recording device and the third recording device changes the other corresponding identifying information relative to and in response to the change in the one of the first identifying information and the second identifying information.

\* \* \* \* \*